US007397970B2

(12) United States Patent
Han et al.

(10) Patent No.: US 7,397,970 B2
(45) Date of Patent: Jul. 8, 2008

(54) AUTOMATIC SCENE CORRELATION AND IDENTIFICATION

(75) Inventors: Ruey-Yuan Han, Winter Park, FL (US);
Tommy J. Piper, Clermont, FL (US);
Robert P. Castagno, Orlando, FL (US);
James M. Martin, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 790 days.

(21) Appl. No.: 11/007,529

(22) Filed: Dec. 7, 2004

(65) Prior Publication Data

US 2006/0120590 A1 Jun. 8, 2006

(51) Int. Cl.
*G06K 9/00* (2006.01)
*G06K 9/36* (2006.01)

(52) U.S. Cl. .................. 382/281; 382/103; 382/291
(58) Field of Classification Search ................ 382/103, 382/281, 291
See application file for complete search history.

(56) References Cited

U.S. PATENT DOCUMENTS

| 5,825,915 | A  | * | 10/1998 | Michimoto et al. ......... 382/154 |
| 6,173,066 | B1 | * | 1/2001  | Peurach et al. ............. 382/103 |
| 6,574,366 | B1 | * | 6/2003  | Fan ............................ 382/201 |
| 6,721,444 | B1 | * | 4/2004  | Gu et al. ..................... 382/154 |
| 6,724,916 | B1 | * | 4/2004  | Shyu .......................... 382/103 |
| 6,816,109 | B1 | * | 11/2004 | Schwartz .................... 342/160 |
| 6,990,253 | B2 | * | 1/2006  | Takeda et al. ............... 382/276 |
| 7,016,539 | B1 | * | 3/2006  | Silver et al. ................. 382/216 |
| 7,054,505 | B2 | * | 5/2006  | Shyu .......................... 382/281 |
| 7,085,401 | B2 | * | 8/2006  | Averbuch et al. ............ 382/103 |
| 2005/0105827 | A1 | * | 5/2005 | Yonaha et al. ............. 382/291 |
| 2005/0271248 | A1 | * | 12/2005 | Teku et al. .................. 382/103 |
| 2006/0120590 | A1 | * | 6/2006 | Han et al. ................... 382/154 |

* cited by examiner

*Primary Examiner*—Jingge Wu
*Assistant Examiner*—Jeffrey S Smith
(74) *Attorney, Agent, or Firm*—Jeffrey D. Myers; Peacock Myers, P.C.; Timothy D. Stanley

(57) ABSTRACT

Computer software for and a method of determining location of a target image within a two-dimensional input image by employing a three-dimensional reference image comprising determining object edge points in the input image; given estimated seeker line-of-sight orientation and range data, computing a two-dimensional reference image from the three-dimensional reference image; applying a weighted-direction-cross-product Hough Transform to the object edge points and points of the two-dimensional reference image; classifying the input image as containing a target image or not; if the image contains a target image, identifying a location of the target image within the two-dimensional input image; computing confidence measure as to the selected location of the target image; and in the case of sequential decision, also performing confidence accumulation through multi-frames or multi-looks.

16 Claims, 12 Drawing Sheets

Fig. 4(a) - 0 degree (Canny direction 0)

Fig. 4(b) - 30 degrees (Canny direction 1)

Fig. 4(c) - 60 degrees (Canny direction 2)

Fig. 4(d) - 90 degrees (Canny direction 3)

Fig. 4(e) - 120 degrees (Canny direction 4)

Fig. 4(f) - 150 degrees (Canny direction 5)

Outputs:
- Aimpoint
- Target/Non-Target Flag
- Confidence
- Accumulated Confidence

AUTOMATIC SCENE CORRELATION AND IDENTIFICATION

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. F08626-96-C-0002 awarded by the U.S. Air Force.

CROSS-REFERENCE TO RELATED APPLICATIONS

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to the field of infrared (IR) image correlation and scene identification.

2. Description of Related Art

Correlation of a target scene with a matching target scene model is typically handled by using the following methods: (1) a conventional correlation technique, e.g., the standard Hough correlation algorithm, which leads to performance degradation while engaging clutter-rich and high-ambiguity target scenes; (2) the use of two-dimensional (2-D) reference models, which limits the selection of ingress angles for missile terminal trajectory and also causes large impact miss distance due to deviations from the pre-planned nominal trajectory; (3) the use of single-frame confidence, not confidence accumulation through multi-frames, resulting in confidence fluctuation from frame to frame and unreliable system performance; (4) some clutter-rejection algorithms using edge-point connectivity only, reducing the effectiveness in removing clutter-induced edges; and (5) discrete changes of model footprints, introducing the serious problems of high degree of ambiguity and high rate of false correlation. Overall, such algorithms have lower than desirable accuracy, are subject to high false-alarm rates, and have very limited success in dealing with robustness.

BRIEF SUMMARY OF THE INVENTION

The present invention is of computer software for and a method of determining location of a target image within a two-dimensional input image by employing a three-dimensional reference image, comprising: determining object edge points in the input image; given estimated seeker line-of-sight orientation and range data, computing a two-dimensional reference image from the three-dimensional reference image; applying a weighted-direction-cross-product Hough Transform to the object edge points in the input image and points of the two-dimensional reference image; classifying the input image as containing a target image or not; and if the image contains a target image, identifying a location of the target image within the two-dimensional input image. In the preferred embodiment, determining comprises clutter-rejection, and preferably further comprises reducing edge points via one or both of grid-point processing and sub-frame histogram processing. Computing comprises receiving estimated seeker line-of-sight orientation and range data from a guidance and control system. Applying comprises employing super-pixeling to select areas of interest, preferably wherein identifying comprises locating a highest peak of a Hough correlation surface within the selected areas of interest. The invention preferably computes quality measures as to the identified location, specifically confidence measures and confidence accumulation over a plurality of instances of application of the method. Applying preferably comprises combining Hough planes by pair-wise AND logic, more preferably wherein combining comprises multiplying correlation counts from each pair of Hough planes, and most preferably wherein combining comprises performing a weighted sum over the pair-wise products from all combinations of Hough planes in pair.

The invention also comprises numerous novel and non-obvious methods and software for various aspects of image processing, alone and in combination. These are detailed below.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 4(a)-4(f) are six templates employed by the preferred clutter rejection method of the invention;

DETAILED DESCRIPTION OF THE INVENTION

Figure 1:
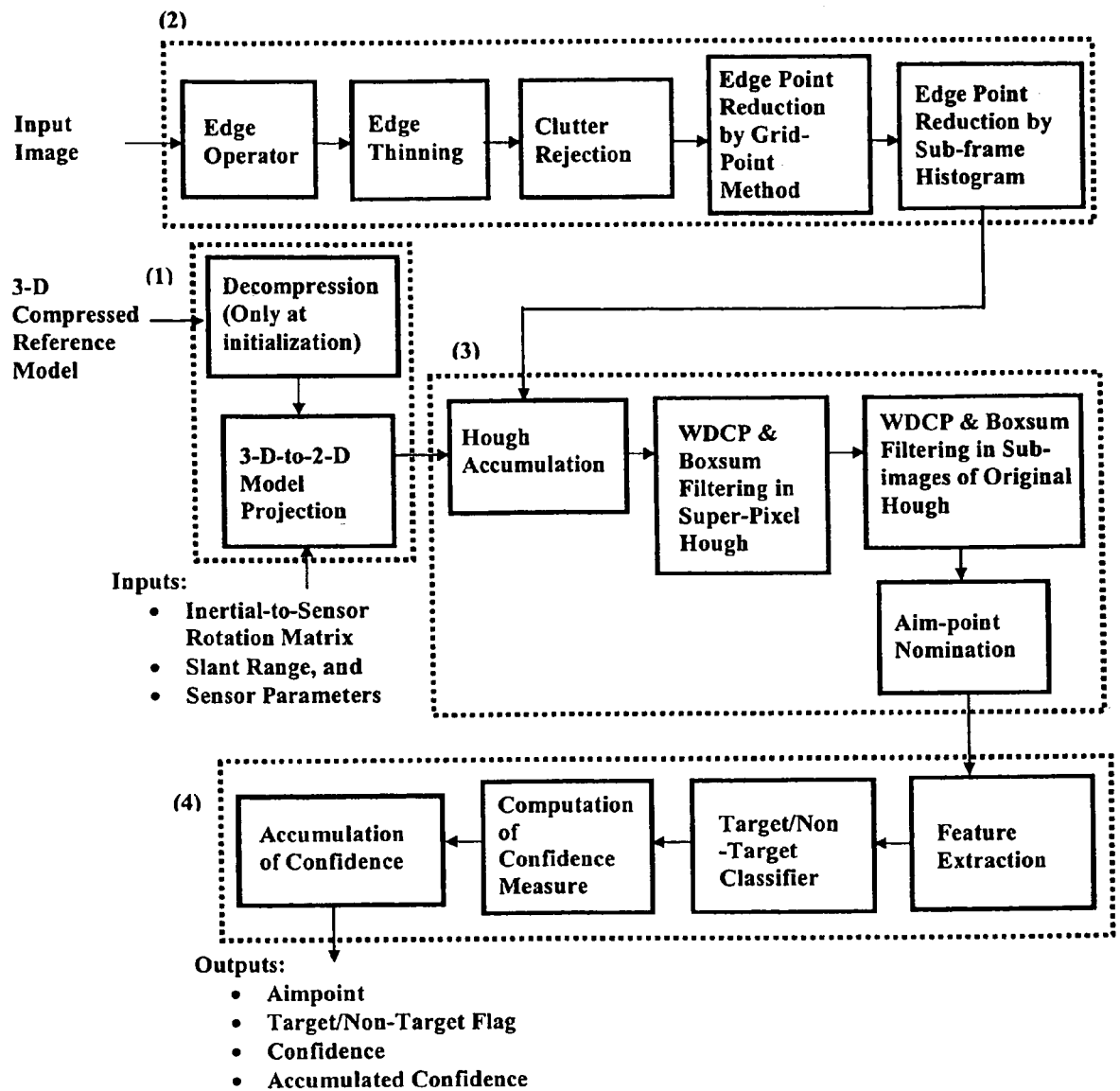
FIG. 1 is a block diagram of the preferred overall method of the invention.

The present invention is of image correlation methods, apparatuses, and software. The invention is discussed largely in its embodiment in IR image correlation within the assignee's Joint Air-to-Surface Standoff Missile (JASSM), a long-range standoff device designed for precision strikes on high-value targets. The present invention is useful in any type of image correlation (e.g., visual spectrum, x-ray, and microwave), however, and should not be considered limited to IR images. During the terminal phase of the missile flight, the Automatic Target Correlator (ATC) of the invention uses IR seeker video and a pre-stored reference model to identify and pinpoint the target aim-point within the field-of-view (FOV) for terminal guidance of the missile. In order to hit the intended target with high accuracy to avoid collateral damage, the ATC meets demanding accuracy requirements while dealing with variety of targets, day and night, in all weather conditions. The ATC provides high accuracy in selecting the correct aim-point while minimizing any probability of misguiding the missile, robustness against a variety of target scenes with wide spectrum of scene complexity, dealing with IR scene variation for all day and all weather conditions, and tight throughput for real-time processing.

The JASSM ATC method preferably employs five stages of processing: (1) Extract edges from the input IR images; (2) Project a pre-stored three-dimensional (3-D) reference model into the 2-D domain for the given line-of-sight (LOS) and range information; (3) Use the WDCP (Weighted Direction Cross Product) Hough correlation method of the invention on the extracted edge points and the projected mode points in aim-point nomination; (4) Classify the input image as target scene versus non-target scene and compute confidence measure associated with the nominated aim-point; and (5) Perform frame-to-frame aim-point association and confidence-measure accumulation.

The present invention includes a correlation method (referred to herein as the WDCP Hough) and a range-dependent method of continuous model adjustment to reduce potential ambiguity in identifying the correct aim-point. The use of a 3-D reference model and the related 3D-to-2D model projection provides the flexibility and, thus, the optimization in attacking the target from different depression angles and heading directions. The unique method of clutter rejection can effectively eliminate clutter objects to reduce false alarms and also improve throughput for real-time processing. Accuracy is also improved by optimized filter design and the use of centroid detection for finer-tuned aim-point selection. The approach used in Target/Non-Target classification and confidence-measure computation can further minimize the probability of misguiding the missiles by any residual false alarms. The frame-to-frame association and the related confidence accumulation improve ATC performance by taking advantage of temporal consistency in detecting the correct aim-point through multiple frames.

The present invention improves from the conventional correlation technique (e.g., the standard Hough algorithm) with 2-D reference models, which achieved much less accuracy and was subject to high false-alarm rates, and with very limited success in dealing with robustness.

The present invention employs a plurality of novel techniques, including: (1) The correlation method called WDCP (Weighted Direction Cross Product) Hough; (2) A new method of Clutter Rejection; (3) Use of a 3D Reference Model and a method for 3D-to-2D model projection; (4) Range-based continuous model adjustment; (5) Model-based edge-point reduction for processing timeline improvement; (6) Target/Non-Target Classifier for cloud-break detection and target area identification; (7) Use of Moment Features and other features in Confidence-Measure computation; (8) A new Frame-to-frame Aim-point Correlation and Confidence-Measure Accumulation; and (9) Overall optimization in algorithm-component design and algorithm suite integration. Another important factor for such a successful design and development is testing against a wide variety of target scenes at different locations, through diurnal and seasonal cycles of IR signature variation, as well as under adverse weather conditions (haze, cloud and rain) and ground conditions (snow-cover and water-soaked ground). The high performance of the present invention has been demonstrated by at least 18 missile flights, with each missile reaching the target with accuracy within the design specifications.

The present invention is designed to perform: (a) frame-to-frame correlation between pre-stored reference model(s) and input images by using the edge information defined within or near the target area, (b) target aim-point selection, and (c) computation of quality measures associated with the selected aim-point. It includes the four major steps of processing as shown in the functional block diagram of FIG. 1:

Step (1)—The 3-D ATC reference model in a compressed format is first decompressed during initialization and then during real-time processing is projected to a 2-D image plane by using sensor line-of-sight and range information provided by Guidance and Control (G&C).

Step (2)—Each of the input image frames is first processed through an edge operator and edge thinning to extract edge points. The results of edge extraction from an image frame are two images, edge-direction image and edge magnitude image. The extracted edge points contain both the true target edges and the clutter-induced edges. The clutter-rejection method is used to reduce the number of the clutter edges. For real-time processing further reduction of edge points is necessary and is performed by using two methods, the grid-point method and the sub-frame histogram method.

Step (3)—The basic processing at this step is to generate a correlation surface between the edge points obtained from Steps (1) and (2) by means of a specialized Hough Transform, the weighted-direction-cross-product (WDCP) Hough, and then to nominate the candidate aim-point from the correlation surface. In order to speed up the processing at this stage, a super-pixeling technique is applied to select the areas of interest (AOI) and the WDCP Hough and the associated box-sum filtering are performed over the selected AOIs, not over the entire image. The aim-point is selected by first finding the highest peak on the Hough correlation surface within the AOIs and then performing centroid detection around the detected peak to finalize the location of the aim-point.

Step (4)—At this step the quality measures associated with the selected aim-point are computed, which involves feature extraction, target/non-target classification, computation of confidence measure, and confidence accumulation through the processed frames.

3-D Reference Model and Model Handling

Figure 2:
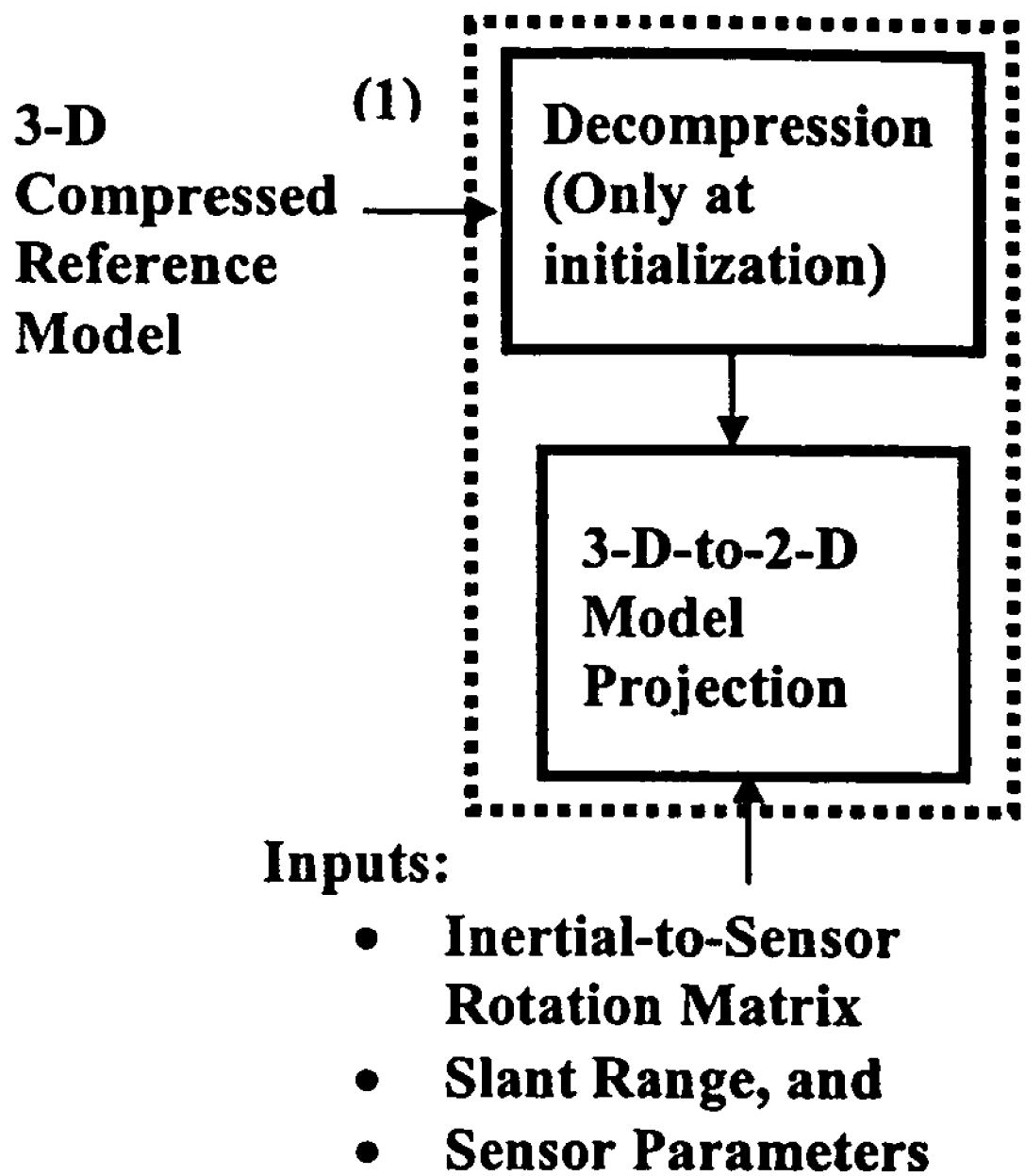
FIG. 2 is a block diagram of the preferred reference model handling method of the invention.

The present invention includes the data format of a 3-D Compressed Reference Model, the method components of the Decompression performed at the initialization stage, and 3D-to-2D Model Projection during real-time processing, which are shown in FIG. 2.

Data Format of Compressed Reference Model

The reference models used in JASSM missions for target correlation are first loaded into the missiles in a compressed data format. This compressed data format, called Compressed Line Structure, is defined in Table 1.

TABLE 1

Compressed Line Structure

| Type | Name | Description | LSB Scale Factor |
|---|---|---|---|
| short int | End_Point_1.North | Topographic North coordinate of line end point 1 (meters) | $2^{-4}$ |
| short int | End_Point_1.East | Topographic East coordinate of line end point 1 (meters) | $2^{-4}$ |
| short_int | End_Point_1.Down | Topographic Down coordinate of line end point 1 (meters) | $2^{-4}$ |
| short int | End_Point_2.North | Topographic North coordinate of line end point 2 OR line direction if a single point line | $2^{-4}$ (End_Point_2) $2^{-15}$ (Direction) |
| short int | End_Point_2.East | Topographic East coordinate of line end point 2 OR line direction if a single point line | $2^{-4}$ (End_Point_2) $2^{-15}$ (Direction) |
| short int | End_Point_2.Down | Topographic Down coordinate of line end point 2 OR line direction if a single point line | $2^{-4}$ (End_Point_2) $2^{-15}$ (Direction) |
| byte | Normal_1.Azimuth | Azimuth angle of Normal_1 (pirads) | $2^{-7}$ |
| byte | Normal_1.Elevation | Elevation angle of Normal_1 (pirads) | $2^{-7}$ |
| byte | Normal_2.Azimuth | Azimuth angle of Normal_2 (pirads) | $2^{-7}$ |
| byte | Normal_2.Elevation | Elevation angle of Normal_2 (pirads) | $2^{-7}$ | uns8 = 1 byte;
uns16 = 2 bytes;
short int = 2 bytes.

Compression of Reference Model

The purpose of applying the data compression technique to the JASSM reference model data is to reduce the amount of data transferred from the aircraft to the missile because of the space limitations of a standard loading cartridge currently used. The Line End-Point Ratio Displacement (LEPRD) compression algorithm compresses the data points by eliminating repetitive data, such as direction and normals of points along the same line. Since points along the same line all share the same direction and normal data, the compressed line structure only stores the starting and ending points (End_Point_1 and End_Point_2) of a line along with the two normals, and displacement ratios of all remaining points on the line. The direction attribute is computed using the two end points. However, in the case where a line consists of only a single edge point, the End_Point_2 field will store the direction of the edge point. This methodology along with least significant bit (LSB) factor scaling of data is the basis of the LEPRD algorithm.

Decompression of Compressed Reference Model

The following procedure outlines the decompression method for LEPRD compressed model data. The decompression is preferably performed only once at the software initialization stage. The goal of decompression is to extract all of the line segments of the model with the following attributes, which will be used later in 3D-to-2D model projection and model edge-point extraction on a frame-to-frame basis in real-time processing:

Location—Topographic NED (North, East, Down) coordinates with respect to origin (0,0,0) (meters)

Direction—A unit vector with direction cosines measured relative to the Topographic NED coordinates Normal Vector 1—A unit vector with direction cosines measured relative to the Topographic NED coordinates Normal Vector 2—A unit vector with direction cosines measured relative to the Topographic NED coordinates Procedure of Decompression:

(1) Extracting End-Points

The locations of the two end points of a line segment are in a scaled NED integer format. At this step the NED coordinates of the two end points are scaled back to the original floating-point numbers.

(2) Computing Direction

The three direction cosines, which represent the direction of the line segment in the NED coordinate system, are computed by using the two extracted end points (3) Extracting Normal Vectors Each line segment has two normal vectors. In the compressed line structure, each normal vector is represented by its azimuth and elevation angles measured relative to the NED coordinate system, which are stored in scaled integer format. At this step the azimuth and elevation angles for each normal vector are first scaled back to floating point values. The direction cosines for each normal vector are then derived from the two angles.

3D-to-2D Model Projection

The model projection involves a point-by-point transformation of the 3-D reference model, either the end points for the line segments with finite lengths or the single edge points and their associated edge directions. The final result of the transformation is a 2-D image composed of the projected edge lines and edge points.

The details of this model projection involve the following transformation:

(1) Translate the origin of the model coordinate system to the aim-point position, which is normally stored as the first record of the ATC reference model;

(2) Rotate the model from the NED coordinate system to the sensor coordinate system for each of the data items:

(a) Location, (b) Edge direction, (c) Normal 1, and (d) Normal 2

$$P_s = M \cdot P_t$$

$$(N1)_s = M \cdot (N1)_t$$

$$(N2)_s = M \cdot (N2)_t$$

$$D_s = M \cdot D_t$$

where M=the NED-to-sensor rotation matrix,
$P_s,(N1)_s,(N2)_s,D_s$=the position, normal, and direction vectors in the sensor coordinate system, and
$P_t,(N1)_t,(N2)_t,D_t$=the position, normal, and direction vectors in the local topographic coordinate system.

(3) Project the model point from its 3-D location onto the 2-D image plane in pixel unit by using perspective projection $$r = R - z$$

$$x_P = \arctan\left(\frac{x}{r}\right) / (IFOV)$$

$$y_P = \arctan\left(\frac{y}{r}\right) / (IFOV)$$

where R=the slant range between the aim point and the sensor in meters,
(x,y,z)=the 3-D location of a given model point in the sensor coordinate system,
$(x_P, y_P)$=the pixel location of the projected model point in the 2-D image plane,
IFOV=the instantaneous FOV (angle subtended by a single pixel).

In this computation, there is no rounding-off or truncation. The equivalent Canny direction is a decimal number, not an integer. In this way, the matching to be made between the edge directions of the seeker image points and the reference model points in Hough Transform can be assigned with any angular tolerance.

Continuous Model Adjustment

The purpose of developing a method for continuous model-size adjustment, replacing the approach with discrete models, is to reduce the ambiguity problems and thus to improve ATC performance by eliminating many wide jumps of the ATC-nominated aim-points. The ambiguity problems can be tremendously alleviated by making the model size more compatible to what is actually covered by the seeker at all ranges. The continuous-model adjustment was derived with this concept in mind.

The overall advantages of using a continuous-model approach can be summarized as follows:
(1) The extent of the model can be dynamically adjusted to match with the ground footprint of the seeker FOV at each given range, thus eliminating the problems of not using some visible and useful target features by a model which is too small and also reducing the problems of using some features outside the seeker FOV but covered by a model which is too large;
(2) The extraction of edge points from a given model, with the total number of model points limited by the timeline requirement, is more optimized because of the continuous range-dependent adjustment of the model size and the edge points thus selected can be more effective in generating the Hough correlation surface in the proximity around the true target aim-point;
(3) The edge-point spacing in pixels on each model line can be easily kept as constant at all ranges to better match with that in input images The continuous-model algorithm involves the following three key processing elements in extracting model edge points:
(1) Clipping of the model, which has been selected and optimized for a longer range, to match up with the extent of ground coverage within the FOV at a given shorter range;
(2) Re-sampling of the edge points along each of the model lines to better match with the spacing between the edge points on the input image, which is a pre-selected constant, and thus to keep a more constant edge density along each of the line segments in the model; and
(3) Tracking of the number of the model points that have been selected after sampling from each model line during the process and re-adjusting the sampling rate (pixels per edge point) before starting to extract additional edge points from next model line in order to meet the upper limit of model points allowed for Hough correlation The following four steps of processing have to be performed before starting the extraction/sampling of edge points from the model:
(1) The decompression of the 3-D reference model in the initialization stage, and
(2) The 3D-to-2D model projection in real-time processing for each image frame in which the end points and the associated normal vectors for each line segment should be projected
(3) Check the two normal vectors for each of the model lines and discard the model line if both of its normal vectors have negative z-component values in the sensor coordinate system, that is, both normal vectors point away from the sensor, indicating a model line not visible.
(4) Check the entire line segment against the FOV clipping window and discard the model line if the entire line segment lies outside the clipping window.

After the extraction of the edge points from the model lines, the direction of each of the edge points, as determined from the direction of the line segment, should be converted from the unit of degrees into the Canny direction unit, that is, the angles to be divided by 30 degrees:
Canny direction 0=0 degrees
Canny direction 1=30 degrees
Canny direction 2=60 degrees
Canny direction 3=90 degrees
Canny direction 4=120 degrees
Canny direction 5=150 degrees All angles either in degrees or in Canny unit are measured relative to the horizontal axis of the image frame.

Edge Extraction and Reduction from Input Image Frames

Figure 3:
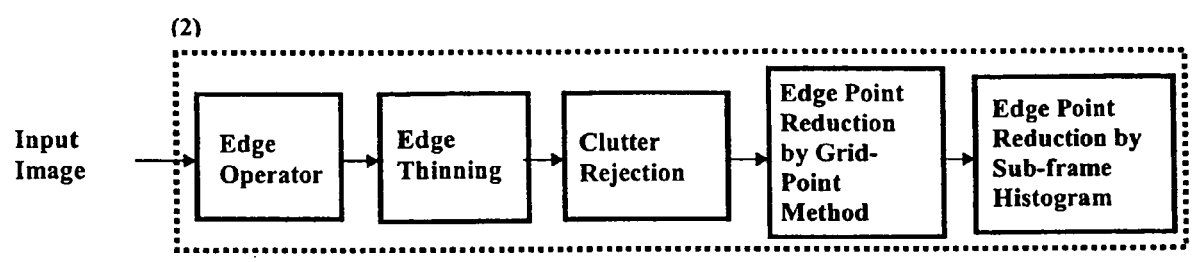
FIG. 3 is a block diagram of the preferred method of the invention for edge extraction and reduction from input image frames.

The present invention preferably includes five steps of processing as shown in FIG. 3, namely:
(a) Edge operator;
(b) Edge thinning;
(c) Clutter rejection;
(d) Edge-point reduction by grid-point method; and
(e) Edge-point reduction by sub-frame histogram.

Clutter Rejection

After applying the Canny edge operator and edge thinning, many clutter edges are extracted from the input images, which do not contribute to the accumulated correlation counts for the true aim-point location. Instead, the clutter edges might create or strengthen false peaks on the correlation surface in competing with the true peak in aim-point nomination.

Many of the clutter edges are due to some local variations of the contrast, such as tree lines, bushes, and many other nature-made texture patterns. These types of clutter edges have a common characteristic, that is, the lack of edge direction consistency between the neighboring edge pixels. On the other hand, the edges of most of the man-made structures show high degree of edge-direction consistency. The clutter-rejection filter is thus designed to explore the edge consistency within each neighborhood region and to eliminate those edge pixels with random edge orientations.

Six (5×5) templates are designed for this filter, which are shown in FIGS. 4(a)-4(f). Each template is designed for testing the consistency between the center pixel and its neighboring pixels for a specific Canny edge direction. The following steps are required in this process:

(1) Decompose the edge-direction image, which is the output from edge thinning operation, to create six binary images, each containing the edge pixels for one specific Canny edge direction, with each pixel location marked with "1" to represent a valid edge pixel or marked with "0" to represent an invalid edge pixel;

(2) For each of the six binary images, select the corresponding template from FIGS. 4(a)-4(f) and perform the following steps of processing:
 (a) Position the center of the selected template at each pixel location marked as valid edge point within the selected binary image;
 (b) Determine the pixel count within Region 1 of the template by checking the number of valid edge pixels falling on the boxes marked with 1's;
 (c) Test this pixel count against the pre-selected Test Threshold No. 1;
 (d) Retain the edge pixel which is at the center of the template, if the pixel count reaches or exceeds this threshold;
 (e) Perform further testing only if the pixel count does not pass Test Threshold No. 1 but meets the criterion of (Test Threshold No. 1 minus 1 count);
 (f) Determine the pixel count within Region 2, the boxes marked with 2's, if the criterion set in Step (e) is met;
 (g) Test this second pixel count against the pre-selected Test Threshold No. 2;
 (h) Retain the edge pixel which is at the center of the template, if the pixel count reaches or exceeds this second threshold;
 (i) Discard the center edge pixel from the edge-direction image if both tests in Step (c) and in Step (g) fail; and
 (j) Repeat Steps (a) through (i) for each pixel location marked as valid edge point within the selected binary image; and (3) Repeat Step (2) through all six binary images.

The threshold values selected for testing can be different for the horizontal/vertical edge directions (Canny directions: 0 and 3) and the diagonal directions (Canny directions: 1, 2, 4, and 5).

Edge Point Reduction by Using Grid-Point Approach

In the ATC method of the invention, a technique with even-spacing reduction is used to reduce edge points in order to meet processing timeline requirement.

Figure 5A:
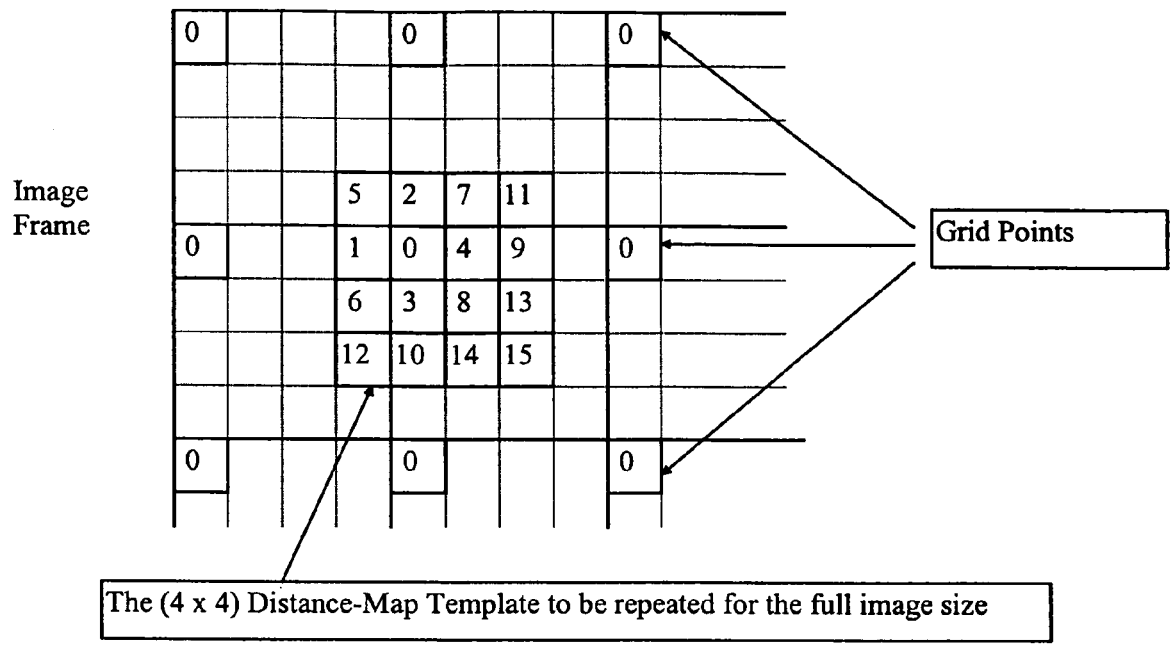
FIG. 5(a) is preferred a (4×4) distance-map template employed by the present invention to be repeated for the full image size used for edge point reduction with a reduction ratio of 4 pixels per point.
Figure 5B:
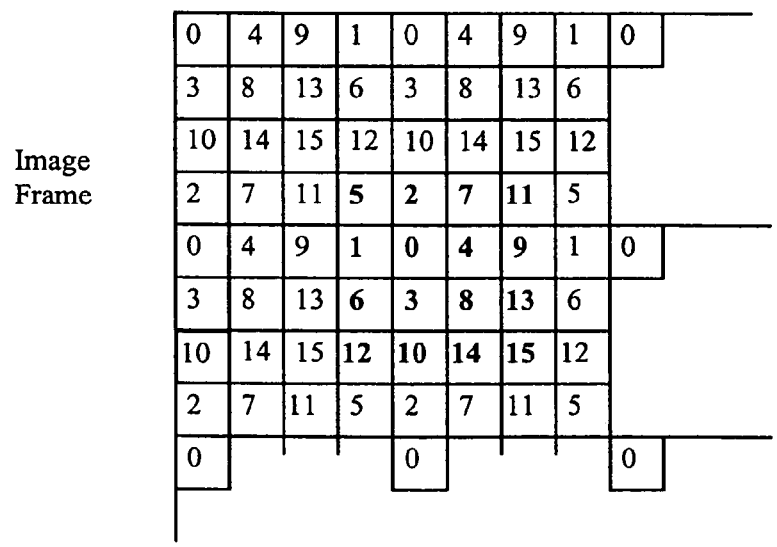
FIG. 5(b) is a distance map extended with the (4×4) template of FIG. 5(a)

The method of edge point reduction by using the grid-point approach provides a fast scheme to reduce the edge points down to those edge pixels which are closest to the grid points. This technique involves the following procedure:

(1) A 2-D distance-weighting map, which is initially generated for a specified point-reduction ratio, is a required input to the method. An example of the distance map generated for the specification of 4 pixels per point is shown in FIGS. 5(a) and 5(b). The (4×4) template shown in FIG. 5(a) is generated first. The full-frame distance-weighting map shown in FIG. 5(b) actually consists of the replica of the (4×4) template. In general, the size of the distance-weighting template is determined by the point-reduction ratio being specified. With a specified reduction ratio of n points per pixel, the template will have an (n×n) array. The distance map and the associated (n×n) template will be provided for implementation. After generating the full-size distance map, which has the same size as that of an input image, this map should be overlaid on the edge image. That is, the upper-left corner of the distance map should be aligned with the same corner of the input image.

(2) During real-time processing, perform the following steps:
 (a) Center a (3×3) template on each of the valid edge pixels, the pixels with edge magnitude greater than zero and with valid edge direction values;
 (b) Find the minimum from the distance weighting values corresponding to the valid edge pixels within the (3×3) template;
 (c) If the center pixel of the template is the edge pixel with the minimum distance value, keep this pixel and store its magnitude and direction values into a file; otherwise, discard the pixel; and
 (d) Repeat the steps (a), (b), and (c) until the template has been placed on every edge pixel location.

The result of this reduction process is an image with edge points evenly spaced out on each line by the required number of pixels.

Edge Point Reduction by Sub-frame Histogram

After edge point reduction by using the grid-point method, further edge point reduction can be achieved by discarding the lower-ranking edge points within each sub-frame, based upon their edge magnitudes. Before performing edge-point reduction, the full image frame is first divided into sub-frames.

Figure 6:
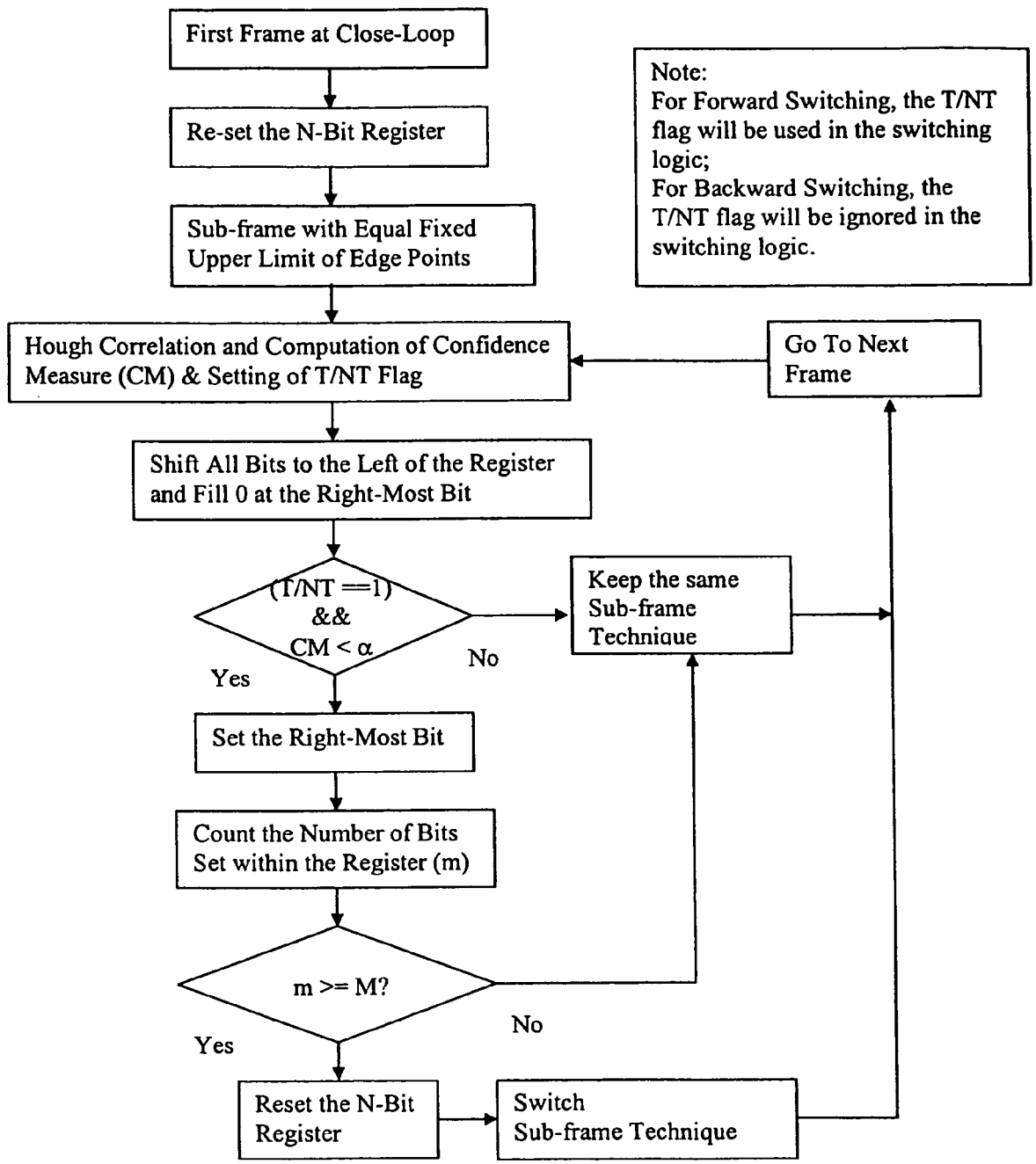
FIG. 6 is a block diagram of the preferred switching logic in the sub-frame histogram method of the invention.

There are two preferred techniques used to limit the number of edge points within each sub-frame. The first one has equal fixed upper limit of edge points allowed for each sub-frame. The second one is a spatial/directional model-guided technique, which dynamically assigns the upper limit of edge points to a sub-frame based upon the spatial and directional distributions of edge points in the given model. On a frame-to-frame basis, one of the two techniques is chosen based upon the confidence measures and Target's/Non-Target (N/NT) flags obtained from the previous frames. The diagram in FIG. 6 depicts the logic used for switching between the two techniques. As shown in this figure, the technique of equal fixed upper limit of edge points will be used first at the beginning of the ATC close-loop with G&C. For each of the subsequent frames processed, the confidence measures and target/non-target flags will be derived and used in the switching logic.

The conditions for switching are defined as follows:
 (a) Forward Switching from Equal/Fixed-Limit Technique to Model-Guided Technique: For a given frame, if Target/Non-Target=1 (i.e., target seen by the seeker), test Confidence Measure against a preset threshold. If the value of the confidence measure of the given frame is lower than the threshold, a flag will be set for the frame. A fixed N-bit register will be used to keep the record of flag setting for the most recent N frames which have Target/Non-Target=1. A switching will be permitted only when a pre-set M-Out-Of-N criterion is met. Once a switching takes place, the N-bit register will be re-set. On the other hand, for a given frame, if the Target/Non-Target flag is 0 (i.e., target not seen by the seeker), no flag will be set regardless of the value of the confidence measure and in this case no increments will be made for either M or N (as if that frame was not processed).

(b) Backward Switching from Model-Guided Technique to Equal/Fixed-Limit Technique. The switching logic of (b) is the same as (a) with the only exception that the Target/Non-Target flag will not be used as the pre-condition for testing confidence measure and setting the register. That is, the test of confidence measure against the preset threshold will solely determine the accumulation of the register, regardless of the setting of the Target/Non-Target Flag. The same M-Out-Of-N criterion is still required for any such switching. Once a switching takes place, the N-bit register will be re-set.

Technique with Equal Fixed Upper Limit of Edge Points

This method is the most fundamental approach in determining the maximum number of edge points allowed for each sub-frame. It puts equal weight on all sub-frames. The equal fixed upper limit applied to each of the sub-frames is obtained by dividing the maximum number of edge points allowed for the entire image by the number of the sub-frames.

Instead of doing point-by-point sorting and ranking based upon edge magnitude, a faster algorithm can be used in which a histogram of edge magnitudes is generated for each of the sub-frames and used to guide the point down-selection.

Model-Guided Technique

It has been proven that the technique with equal fixed upper limit of edge points is an adequate approach in dealing with most of the cases where the edge features around the target area have reasonably high contrast. In some other cases with clutter-rich environment where clutter edges show higher contrast than target-related features, the same technique can cause significant loss of some key target edges with low contrast, thus leading to poor performance in model-image correlation. Further algorithm improvement is required in dealing with these cases.

The model-guided approach of the invention is based upon the concept that those edge points of the input image with locations and directions more compatible with those of the reference model should be retained with higher probability. In this way more clutter edge points can be eliminated, instead of the useful target-related edge points.

The basic assumption made for the model-guided approach of the invention is that the true aim-point of the target resides within certain bounds from the center of the FOV based on expected Guidance and Navigation error limits.

The method is described as follows:

(1) Deriving the Model Spatial Distribution.

After the 2-D model has been derived for the current frame through model projection and continuous-model extraction, the spatial distribution of the projected reference model points can be determined as they fall into the sub-frames.

(2) Deriving the Model Directional Distribution.

After mapping the model points into the sub-frames, the directional distributions for each sub-frame can then be determined.

(3) Procedure of Edge Point Reduction.

Figure 7:
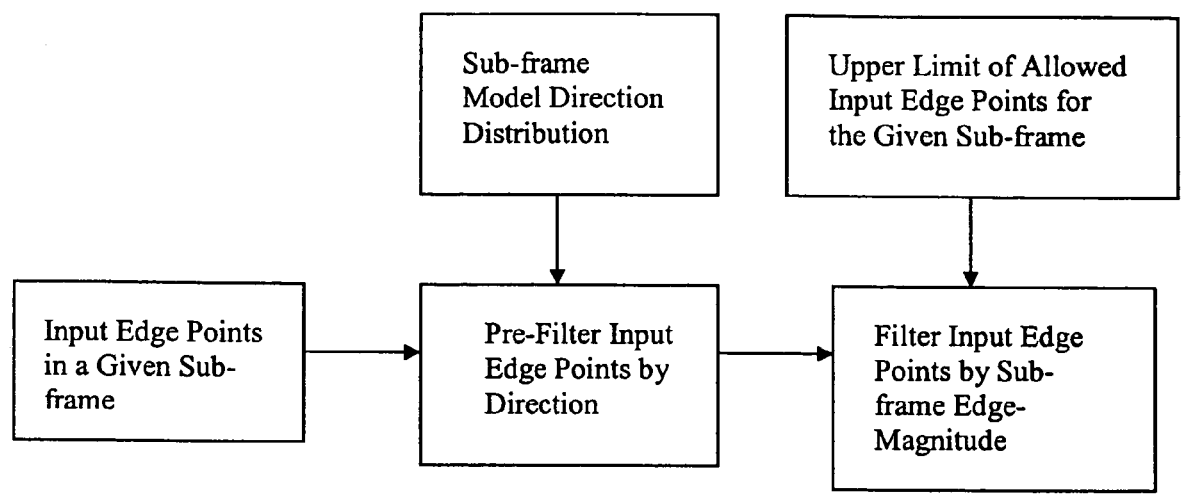
FIG. 7 is a block diagram of the preferred model-guided sub-frame edge point reduction of the present invention.

The procedure of edge point reduction is shown in FIG. 7 and preferably involves the following steps:

(a) Pre-Filter by Edge Directions. This stage of the algorithm eliminates those image points within each sub-frame that do not conform to the directional distributions.

(b) Filter by Sub-frame Edge-Magnitude Histogram. At this point the sub-frame histogram process is very similar to that described in the method of the Equal/Fixed-Limit Technique. The only difference is the number of points allowed for each individual sub-frame. Instead of using a fixed and equal number for each sub-frame, the spatial distribution of the model points is used to define the number of points allowed for each sub-frame.

Procedure of Correlation Computation and Aim-point Nomination

Figure 8:
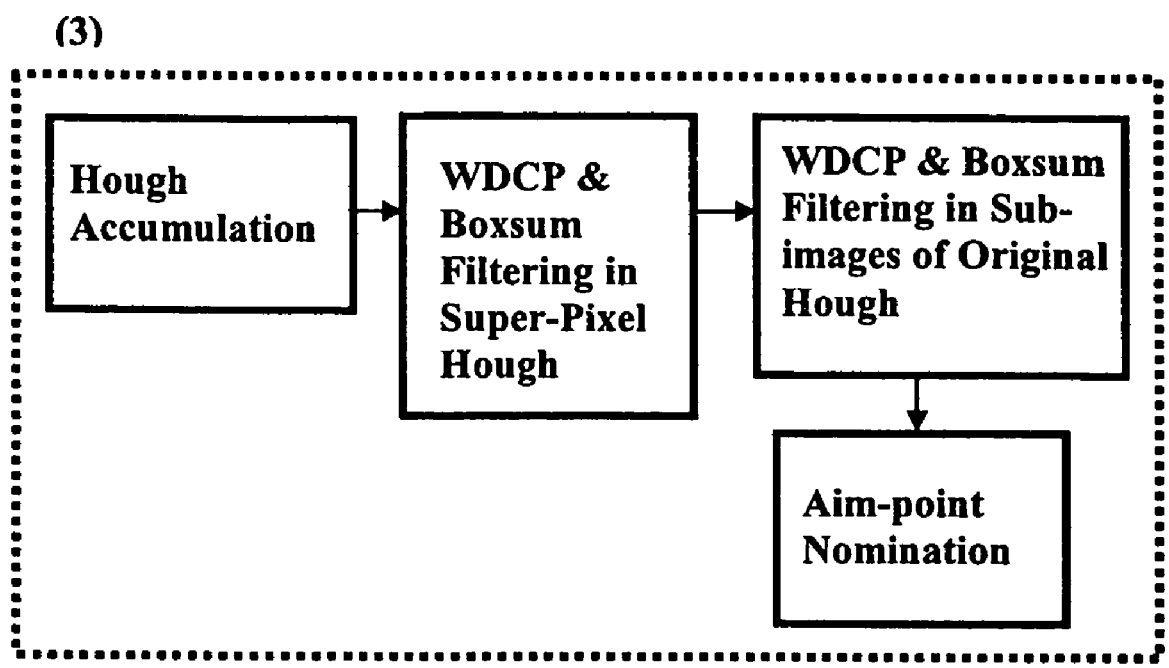
FIG. 8 is a block diagram of the preferred correlation computation and aim-point nomination process of the invention.

This method of the invention includes the following steps of processing, as shown in FIG. 8:

(a) Perform Hough correlation between edge points extracted from input image and edge points derived from reference model projection for each Canny direction, to form six Hough correlation planes;

(b) Determine the Area of Interest (AOI) by first deriving the super-pixel WDCP Hough correlation surface and then selecting the peaks from the super-pixel Hough surface;

(c) Generate the WDCP Hough correlation surface for each of the AOI's; and (d) Nominate the peak point as the candidate aim-point from the AOI's.

WDCP Hough Transform

In the standard Hough algorithm, the 2-D Hough Transform is used to measure the degree of edge correlation between the input image and the reference model. In most of the cases, two edge directions or sometimes three edge directions might equally dominate in the target scene. The standard Hough Transform will perform well in this case. In some other cases, the majority of the long edge lines shown in the target scene might run in a single direction while only a few short edge lines are present in the other directions. In this latter case, the Hough correlation surface is dominated in that single direction. As a result, aim-point selection will be subject to more errors. In order to alleviate this problem, the selection of an aim-point should be accomplished by equally emphasizing the primary direction (the direction with the largest number of edge points) and at least one of the secondary directions (the directions with the second and third largest numbers of edge points).

In performing Hough Transform, the accumulation of correlation counts in matching up the edge points between input image and reference model can be handled individually for each of the six edge directions. These individual Hough planes can be later combined into a final correlation surface. In the standard approach, the six Hough planes are summed up pixel by pixel. In this way, the dominant direction will fully control the selection of aim-point. This logic is called OR logic because the aim-point is selected on the basis of the total correlation counts, ignoring the origin of the counts. An alternative approach is to combine the individual Hough planes by pair-wise AND logic, in which the correlation counts from each pair of Hough planes are multiplied together at the corresponding pixel locations and then a weighted sum is performed over the pair-wise products from all combinations of Hough planes in pair. In this approach, the secondary Hough planes will play much more significant roles to complement the primary Hough plane in aim-point selection.

The preferred method of the invention involves the following steps:

(1) Computation of the direction-weighting coefficients

The direction weighting coefficients ($w_{ij}$) used for pair-wise products between six Hough planes can be determined by several methods, which include, but not limited to, the following two examples:

(a) Weighting coefficients computed by using the direction histogram of the projected 2D reference model; and (b) Weighting coefficients derived by using the trigonometric sine function of the relative angle between the two directions of each pair, that is, those pairs with two directions more perpendicular to each other will have higher weighting coefficients;

(2) Direction matching and histogram accumulation into individual Hough planes ($H_0, H_1, H_2, H_3, H_4, H_5$), each corresponding to a specific Canny edge direction;

(3) Generation of the final Hough correlation surface by performing the following computation to combine the Hough correlation planes pixel by pixel:

$$H = \sum_{i,j} (H_i \cdot H_j) \cdot w_{ij}$$

where the summation is generally performed over all combinations of the pair-wise products, totaling fifteen terms altogether.

Practically not all fifteen terms are needed. In most cases only a few top terms with the higher weighting coefficients and the more dominating edge directions are required in generating the WDCP Hough Transform.

Procedure of Peak Detection

In order to create the WDCP Hough correlation surface and to detect correlation peak in an efficient way, the following procedure should be followed. The concept of this procedure is to reduce the timeline by dividing the whole sequence of processing over the entire image into two steps. In the first step, the super-pixel technique is applied to select AOI's. In the second step, the whole processing sequence of generating WDCP Hough, applying filters, and detecting correlation peak is applied only to the selected AOI's, instead of being applied to the entire image. Multiple peaks can be detected by looping through the two-step procedure. Significant reduction of processing time is achieved in this way.

Figure 9:
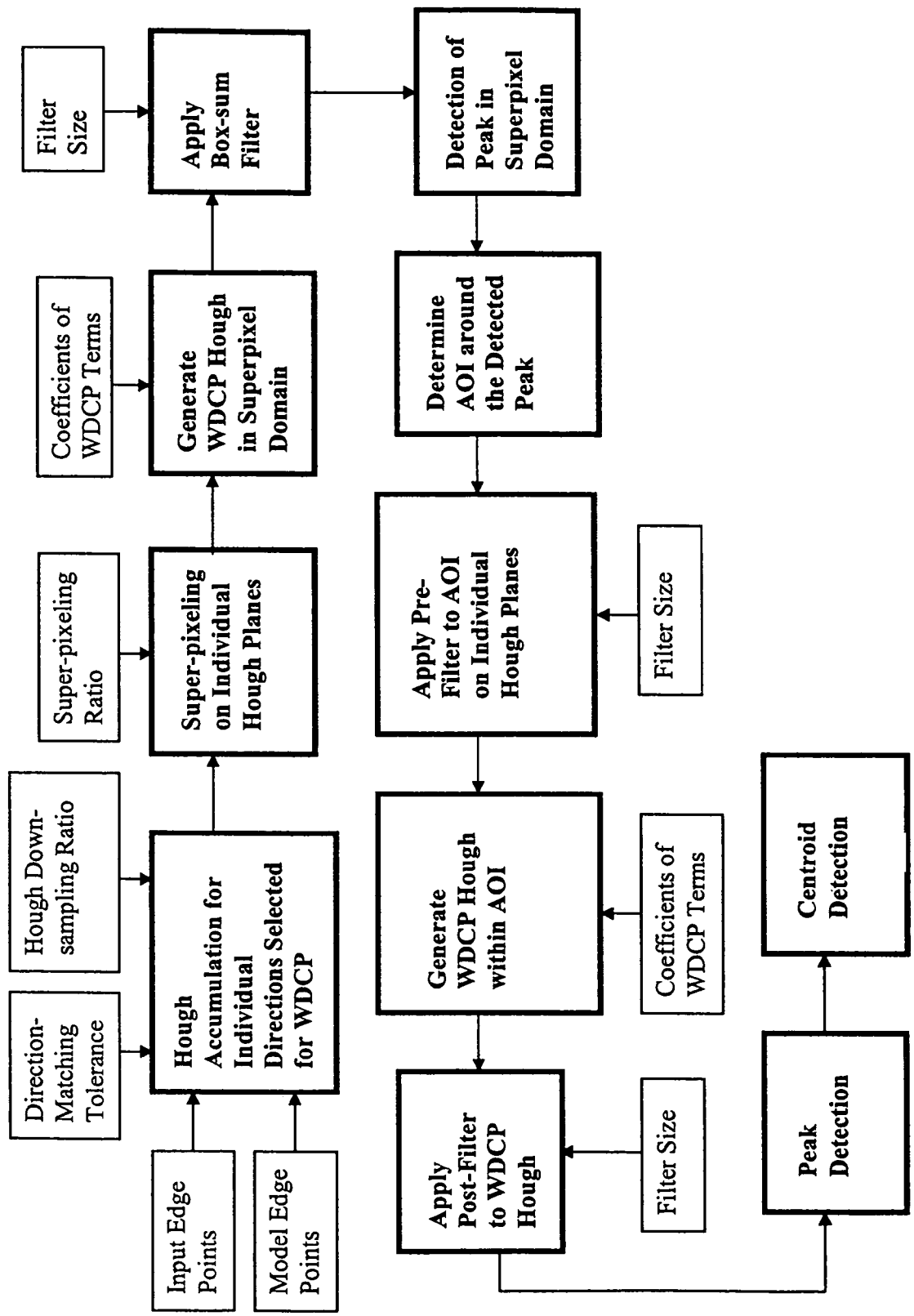
FIG. 9 is a block diagram of the preferred Weighted Direction Cross Product (WDCP) transform with super-pixeling and double filters and aim point selection with centroid detection processes of the invention.

This procedure, as shown in FIG. 9, involves the following steps of processing:

(1) Identify the Canny directions which are needed to provide the required number of leading terms as specified in the WDCP computation; compute the corresponding WDCP weight coefficients; perform Hough accumulation for each of the selected Canny directions with the specified down-sampling factor and the direction-matching threshold;

(2) Generate a super-pixel image for each of the raw Hough planes, using a specified super-pixel size;

(3) Obtain the WDCP Hough in the super-pixel domain;

(4) Apply a box-sum filter to the super-pixel WDCP Hough Transform;

(5) Detect the highest super-pixel in the filtered super-pixel WDCP Hough image;

(6) Select an AOI region centered at the center of the detected super-pixel;

(7) Apply a pre-WDCP filter to the individual Hough planes within the selected AOI;

(8) Generate the WDCP Hough within the Pre-Filtered AOI region;

(9) Apply a post-WDCP filter to the WDCP Hough obtained in Step(8);

(10) Search for the highest point within the post-WDCP filtered Hough; and

(11) Perform centroid detection at the highest peak to determine the aim-point location.

The procedure of Hough generation and peak detection described above can be repeated in a loop as many times as desired to perform multi-peak detection if multi-peak outputs become a requirement. In this case, the loop can be stopped when the required number of peaks has been detected or when a point is reached beyond that any further peak detection will provide only low minor peaks.

Computation of Quality Measures

Figure 10:
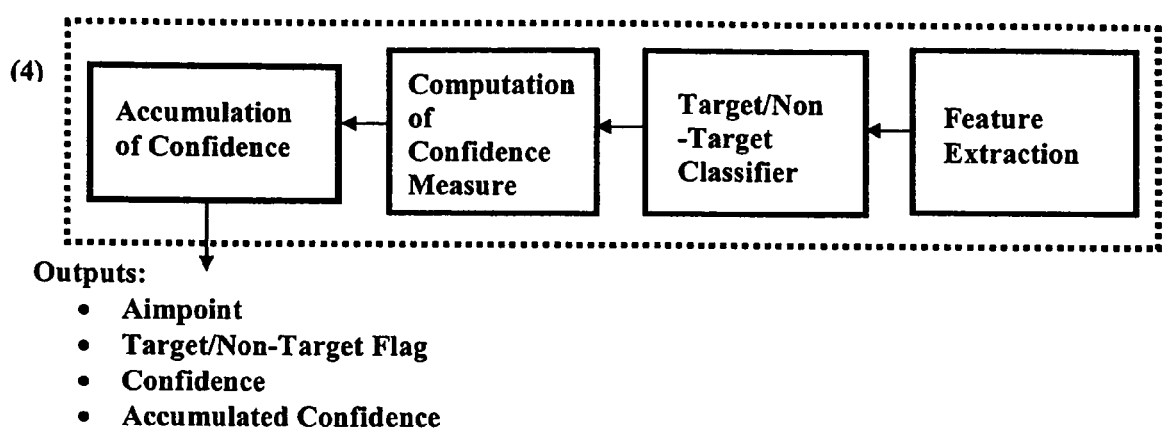
FIG. 10 is a high-level block diagram of the preferred computation of quality measures according to the invention.

The present invention includes the following steps of processing, as shown in FIG. 10:

(a) Extraction of Features to be used for the subsequent steps;

(b) Perform Target's/Non-Target classification;

(c) Compute confidence measure; and (d) Perform Frame-to-Frame confidence accumulation.

Extraction of Features

The features preferred to be extracted are listed below:

(1) Percent of the matched model points;

(2) Correlation Coefficient of Edge Direction Histograms;

(3) Background-to-Peak Ratio;

(4) Signal-to-Clutter Ratio (SCR);

(5) Model edge-point ratio between the primary and the secondary directions; and (6) Normalized $2^{nd}$-Order Moment.

Figure 11:
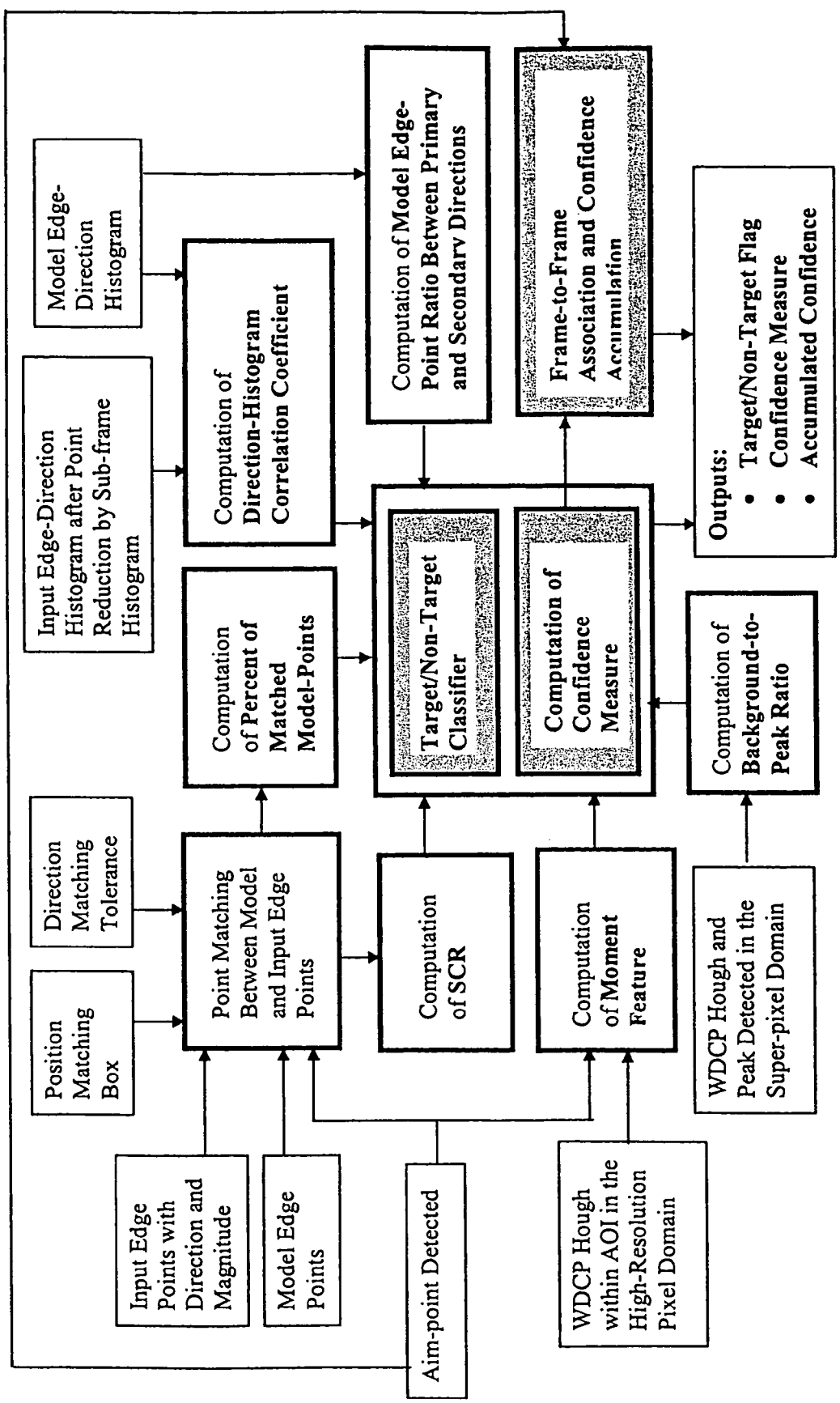
FIG. 11 is a detailed block diagram of the preferred computation of quality measures according to the invention.

The functional block diagram in FIG. 11 shows the inputs required for the computation of individual features and the inter-relationships between the features and the generation of quality measures.

Percent of Matched Model Points

After translating the 2-D model to make the model aim-point coincident with the ATC-nominated aim-point, correspondence between the model edge points and the input image points can be established. After finding the number of the model edge points which are matched with corresponding input image points, the following percentage is computed:

$$r = \frac{N_M}{N_T}$$

where $N_T$=the total number of the 2-D model edge points within the FOV after model translation to the ATC-nominated aim-point, and $N_M$=the number of those of the $N_T$ model edge points matched with input edge points Direction-Histogram Correlation Coefficient The next feature to be used in the target and non-target classification is the correlation coefficient between the direction histogram of the model edge points and the histogram of the image edge points. Correlation is used to measure the similarity between the two direction histograms. If the correlation between the two histograms is very high, this indicates a high degree of similarity and thus a higher likelihood of the presence of the target within the FOV. A low correlation will indicate that the target area is masked by cloud or the target area is outside the FOV.

The six Canny direction units are used as the histogram bins. The equation to be used to compute the correlation coefficient is given as follows:

$$C = \frac{\frac{1}{N}\sum_i [(g_i - \bar{g}) \cdot (f_i - \bar{f})]}{\left\{\frac{1}{N}\sum_i (g_i - \bar{g})^2\right\}^{1/2} \cdot \left\{\frac{1}{N}\sum_i (f_i - \bar{f})^2\right\}^{1/2}}$$

where $f_i, g_i$ = the values of the $i$th histogram bin of the input-image direction histogram and the reference-model direction histogram, $\bar{f}, \bar{g}$ = the mean values of the two direction histograms, $N$ = the number of the bins in each histogram, which has a value of 6, and $\sum_i [\ ]$ = the summation performed over the six histogram bins.

The numerator in this equation represents the correlation between the two histograms and the two root-mean-square-difference computations in the denominator are the individual sigma values of the two histograms. The correlation coefficient thus computed is a normalized coefficient, which has a value ranging from −1.0 to +1.0.

Background-to-Peak Ratio

The background-to-peak ratio is defined as the reciprocal of the ratio of the highest peak relative to the average background value of the Hough surface. The average background value is computed from the Hough surface with the peak region excluded.

Signal-to-Clutter Ratio (SCR)

First the edge point correspondence must be established between the model edge points and the input edge points after translating the 2-D model to make the model aim-point coincident with the ATC-nominated aim-point. In general the edge points derived from a given input image can be categorized into two groups, those matching with the model edge points, called signal edge points, and those without matching, called clutter edge points. The SCR feature can be computed in the following steps:

(1) Compute the average value for the edge magnitudes of the signal edge points, which represents the average signal strength of the target edges;
(2) Compute the average value for the edge magnitudes of the clutter edge points, which represents the average edge strength of the clutter edges; and
(3) Compute the signal-to-clutter ratio by dividing the average signal edge magnitude by the average clutter edge magnitude.

Model Edge-Point Ratio Between the Primary and the Secondary Directions

In order for the WDCP Hough Transform to perform well, a minimum of two edge directions are required for which two individual Hough planes can be generated and used for the cross product in the WDCP Hough computation. In some of the cases, the secondary direction does not have adequate target edge points for correlation between the model and the input image frame. The corresponding Hough plane is more dominated by the clutter edge points, leading to higher probability of selecting a wrong peak in the WDCP Hough domain. The edge-point ratio between the secondary and the primary directions provides a good indicator to predict the potential of selecting an incorrect peak.

The computation of this feature involves the following procedure:

(1) Generate the six-bin edge-direction histogram of the model
(2) Within the edge-direction histogram, select the bins with the highest number and the second highest number of edge points as the primary and the secondary directions, respectively.
(3) Compute the ratio of the number of the edge points in the secondary direction relative to that of the primary direction.

Normalized 2nd-Order Moment

The feature of $2^{nd}$-order moment is defined by the following equation:

$$M = \left[\frac{1}{(F_N)}\sum \{H(x, y) \cdot [(x - x_P)^2 + (y - y_P)^2]\}\right]^{1/2} \quad (1)$$

$F_N = \Sigma H(x,y)$ where M = the $2^{nd}$-order moment

H(x,y) = the Hough value at the pixel (x,y), $(x_P, y_P)$ = the location of the primary peak, (x,y) = the pixel with a Hough value greater than or equal to a threshold $H_0$, $\Sigma$ = the summation to be performed over the pixels in the Hough domain with values greater than or equal to the threshold, $F_N$ = the integrated total Hough count over the pixels with Hough values greater than or equal to the threshold The threshold value is determined by using the following equation:

$$H_0 = P \cdot H_P \quad (2)$$

where P = a preset percentage value used to determine the threshold value, and $H_P$ = the peak value of the primary peak The value of the moment feature as defined above is not bounded over [0,1] as all other features used in the Target/Non-Target classification and Confidence-Measure computation. In order to avoid any potential numerical difficulty in classifier training the value of the moment feature should be brought closer to the ranges of values of the other features. Therefore, feature normalization is required.

The original design of the moment feature requires a computation over the whole Hough plane. In the case with limited processing timeline, the moment feature computation could be performed over the selected AOI's.

A procedure of feature computation and normalization in the current invention includes the following steps:

(1) Compute the moment feature (M) as defined by Equation (1) within the selected AOI's using a specified percent threshold, P;
(2) Compute the moment feature ($M_A$) within the same selected AOI's with a zero percent threshold, that is, compute the moment feature over all of the pixels within the AOI's, and
(3) Perform normalization by dividing the two moments computed in Steps (1) and (2):

$$M_N = \frac{M}{M_A} \quad (3)$$

The normalized moment feature as defined by Equation (3) is preferably used in the classifier training for Target/Non-Target classification and Confidence Measure computation.

Target and Non-Target Classification

The purpose of using the target and non-target classification algorithm is to determine when the target area on the ground becomes visible and, in the particular case of presence of clouds, to predict when the missile will penetrate through the cloud. This component is preferably part of the ATC method of the invention, and is executed for every cycle of ATC processing.

This part of the method of the invention preferably involves two stages of processing, feature computation and classification. The features to be used preferably include the following:
(1) Signal-to-Clutter Ratio (SCR),
(2) Correlation Coefficient of Direction Histograms,
(3) Normalized $2^{nd}$-Order Moment,
(4) Percent of Matched Model Points, and
(5) Background-to-Peak Ratio.

The classifier is designed with a classifier-tree structure. For each input image, the values of the selected discriminate features are first computed. The feature values are then applied to the classifier tree for target and non-target classification. This tree has two layers: the top layer with a single sorting node used to sort the incoming sample into two categories; the bottom layer with two decision nodes used to make final classification for target and non-target. In the sorting node, the single-feature thresholding technique is used to perform sorting. In each of the decision nodes, a Fisher-linear classifier is designed with a selected set of features.

(1) Sorting node in the top layer:
If the value of the sorting feature of the given image frame is larger than a pre-set threshold, the sample under testing will be passed into Node #1 of the lower layer. Otherwise the sample will be passed into Node #0 of the lower layer
(2) Decision nodes in the lower layer:
(a) Node #0:
If $w_{01} \cdot x_1 + w_{02} \cdot x_2 + w_{03} \cdot x_3 + w_{04} \cdot x_4 + w_{00} \geq 0$, then $\bar{x} \in C_1$;
Otherwise, $\bar{x} \in C_2$
(b) Node #1:
If $w_{11} \cdot x_1 + w_{12} \cdot x_2 + w_{13} \cdot x_3 + w_{14} \cdot x_4 + w_{10} \geq 0$, then $\bar{x} \in C_1$;
Otherwise, $\bar{x} \in C_2$
where $w_{01}, w_{02}, w_{03}, w_{04}$=the weighting coefficients of the Fisher-linear discriminate function, which determine the orientation of the Fisher plane in partitioning the feature space in Node #0,
$w_{00}$=the threshold used to determine the displacement of the Fisher plane in Node #0,
$w_{11}, w_{12}, w_{13}, w_{14}$=the weighting coefficients of the Fisher-linear discriminate function, which determine the orientation of the Fisher plane in partitioning the feature space in Node #1,
$w_{10}$=the threshold used to determine the displacement of the Fisher plane in Node #1,
$\bar{x} = (x_1, x_2, x_3, x_4)$=the feature values computed for a given image frame,
$C_1$=the target class, and
$C_2$=the non-target class.

The features used in the classifier tree are defined as:
(1) Sorting-Node Feature—Signal-to-Clutter Ratio
(2) Decision-Node Feature #1—Correlation Coefficient of Direction Histogram ($x_1$)
(3) Decision-Node Feature #2—Normalized $2^{nd}$-Order Moment ($x_2$)
(4) Decision-Node Feature #3—Percent of Matched Model Points ($x_3$)
(5) Decision-Node Feature #4—Background-to-Peak Ratio ($x_4$).

Computation of Confidence Measure

Ambiguity in aim point selection is related to those cases in which false peaks are closely competing with the true peak of the aim point in the Hough domain. Confidence measure is an indicator of the likelihood that the correct Hough peak has been selected, which contains the true aim point. The computation of confidence measure preferably involves two major steps:
(1) Feature computation; and
(2) Confidence computation by using a classifier tree.

The features used for confidence-measure computation preferably include the following:
(1) Correlation Coefficient of Edge Direction Histograms;
(2) Model edge-point ratio between the primary and the secondary directions;
(3) Background-to-Peak Ratio;
(4) Normalized $2^{nd}$-Order Moment; and
(5) Percent of the matched model points For each input image frame, the values of the selected discriminate features are first computed. The feature values are then applied to the classifier for confidence measure computation. In this classifier the Fisher-linear technique is applied in the selected multiple-feature space to derive confidence values.

For missile guidance in terminal flight phase multiple classifiers can be trained with exactly the same feature set but using different training sample sets. Each classifier is trained for a specific range interval to obtain its own classifier coefficients.

For each of the samples, that is, for each of the frames, the confidence value will be computed by using the following procedure:
(a) Check the current range against the range intervals to determine which set of classifier coefficients should be used;
(b) Perform the projection of the sample onto the Fisher axis by using the following equation:

$f = w_1 \cdot x_1 + w_2 \cdot x_2 + w_3 \cdot x_3 + w_4 \cdot x_4 + w_5 \cdot x_5 \quad (1)$ where f=the projected Fisher value,
$w_1, w_2, w_3, w_4, w_5$=the weighting coefficients of the Fisher-linear discriminate function, which determine the pointing direction of the Fisher axis in the feature space, and
$\bar{x} = (x_1, x_2, x_3, x_4, x_5)$=the feature values computed for the given image frame.

(c) Compute the confidence value by using the following equations derived from curve fitting:
  (i) If $f<f_1$, set C=0.0;
  (ii) If $f>f_2$, set C=1.0;
  (iii) Otherwise, $$C=b_0+b_1 f+b_2 f^2+b_3 f^3 (f_1 \leq f \leq f_2) \quad (2)$$

where C=confidence measure;
  $f_1,f_2$=the two limits defining the interval within which the cubic equation derived from curving fitting is valid; and
  $b_0,b_1,b_2,b_3$=the coefficients of the cubic equation obtained from curve fitting.

The confidence measure is a probabilistic value, bounded between 0.0 and 1.0.

Frame-to-Frame Aim-point Association

Figure 12:
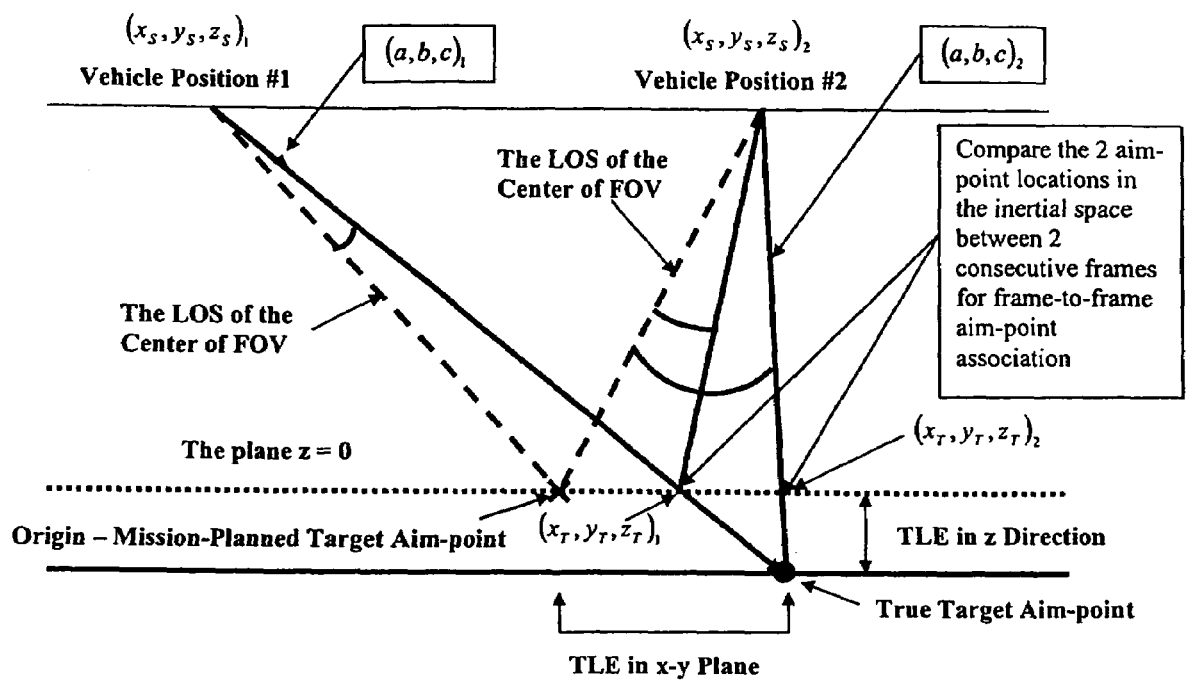
FIG. 12 illustrates a geometry for frame-to-frame aim-point association according to the invention.

The preferred approach in dealing with frame-to-frame aim-point association is to determine the location of the ATC-selected aim-point within the inertial coordinate system once the aim-point is selected within an image frame. This approach is illustrated in FIG. 12.

At each vehicle position perform the following computation to locate the ATC-selected aim-point within the inertial coordinate system:

(1) Derive the vehicle position within the inertial coordinate system: In this computation the mission-planned location of the target aim-point is taken as the origin of the inertial coordinate system;

(2) Determine the location of the ATC-selected aim-point in the inertial coordinate system:
  (a) Derive the rotation matrix for the sensor-to-inertial coordinate transformation;
  (b) Compute the direction cosines for the vector pointing from the vehicle position to the ATC-selected aim-point within the sensor coordinate system;
  (c) Perform coordinate transformation on the direction cosines by using the rotation matrix derived in Step (2a) to obtain the direction cosines (a,b,c) in the inertial coordinate system; and
  (d) Determine the 3-D location of the ATC-selected aim-point within the inertial coordinate system; and (3) Check to see whether the location of the aim-point $(x_T,y_T,z_T)_2$ within the inertial space obtained for the current frame is within a tolerance distance from the location of the aim-point $(x_T,y_T,z_T)_1$ selected previously. If the answer is true, the association has been established and then the single-frame confidence-measure values of these two frames can be accumulated.

This procedure can be repeated from frame to frame.

In Step (2d) the inertial-space location of the ATC-selected aim-point $(x_T,y_T,z_T)_1$ is determined by using the horizontal plane through the mission-planned aim-point to intercept the LOS pointing from the vehicle position $(x_S,y_S,z_S)_1$ in the direction of $(a,b,c)_1$. Because the true range to the target is unknown during the missile flight, the only reasonable way for locating the ATC-selected aim-point in the inertial space is to assume that this aim-point has the same elevation above the ground as the mission-planned aim-point. This assumption might introduce some additional error in aim-point association. FIG. 12 shows two vehicle positions and the associated ATC-selected aim-points in a very exaggerated manner. In reality most likely the two vehicle positions are aligned on a more or less straight trajectory and the LOS from these two positions towards the ATC-selected aim-points should be very close to each other. Therefore, the additional error introduced in aim-point association by the assumption of same elevation for the mission-planned aim-point and the ATC-selected aim-point should be very small, if there is any.

Accumulation of Confidence Measure

After establishing aim-point association through frames, the confidence measures obtained from individual frames can be accumulated by using the method in this invention. At each frame the confidence measure derived individually for the given frame and the confidence measure accumulated through the previous frames and the current frame can be tested separately against a pre-selected threshold value. If either of the two can pass the threshold test, the aim-point is acceptable for G&C update.

The preferred method of Confidence-Measure Accumulation employs the following equations:

$$C_A = \frac{1}{1 + [P(k) \cdot F^{-1}]} \quad (9)$$

$$P(k) = \sum_{i=1}^{(k)} \left[\left(\frac{1-C(i)}{C(i)}\right) \cdot F\right] = \left\{\left[\frac{1-C(k)}{C(k)}\right] \cdot F\right\} \cdot P(k-1) \text{ if } C(i) > 0$$

$$F = \frac{B}{(1-B)}$$

$$0.0 \leq B < 1.0$$

where $C_A$=the accumulated confidence measure;
  P(k)=the Confidence Accumulation Factor carried up to the current frame, which bears the history of accumulation from the very first frame where accumulation is started,
  C(i)=the confidence measure obtained from each individual frame,
  k=the number of frames involved in the confidence-measure accumulation including the current frame, if association has been established, and
  B=a pre-selected bias value for accumulation control Equation (9) is a recursive equation, which can be started by either of the two ways:
  (a) Set P(0)=1 at the initialization stage and then perform accumulation for the very first frame with k=1, or
  (b) Start the computation only when there are two frames with association by using the following equation:

$$P(1) = \left[\frac{1-C(1)}{C(1)}\right] \cdot F$$

It should be noticed that for the very first frame with k=1, $C_A$=C(1).

The value of P(k) should be bounded by some properly chosen upper and lower boundaries.

If C(i)=0 for one frame, no accumulation should be performed and the frame should be skipped, even if the association has been established.

The bias value selected for accumulation control will determine the following characteristics of confidence-measure accumulation:

(1) Accumulation in positive or negative direction: If the values of single-frame confidence measures are more on the side higher than the bias value, the frame-to-frame accumulation will have the trend of increasing the confidence measure and is in the positive direction of accumulation; on the other hand, if the values from single frames fall more on the side lower than the bias value, the accumulation will have the trend of decreasing the confidence measure and is in the negative direction of accumulation.

(2) The speed of accumulation either in positive or negative direction: The speed of accumulation is determined by two factors:
  (a) the consistency of having the individual frame values on one side of the bias value, and
  (b) the difference of the individual frame values relative to the bias value.

The more consistency of the individual frame values on one side and the larger difference between individual frame values and the bias value, the faster the speed of accumulation.

(3) The reverse of the direction of accumulation:

The direction of accumulation can be reversed from the positive accumulation to the negative accumulation or vice verse. Such reverse in the direction of accumulation will be determined by the following factors:
  (a) the past history of accumulation, and
  (b) the strength of swing of the individual frame values from one side to the other side.

In general the longer trend of accumulation in one direction in the past history will require more upcoming frames with individual frame values strongly swing to the other side before the trend of accumulation will start to switch into the other direction.

This method of confidence-measure accumulation is derived with the assumption of statistical independence between image frames. It truly represents the way in which human being will behave in making decision based upon multiple looks. It is important to point out that the function of accumulating confidence measure through image frames is completely different from the function of filtering or smoothing.

As readily understood by one of ordinary skill in the art, apparatuses according to the invention, including all the means claimed in the apparatus claims hereto, can be deployed using any known data processing hardware, software, and hardware/software combinations. These include Field Programmable Gate Arrays (FPGAs), other microcoded hardware, analog hardware, microprocessors in conjunction with conventional random access memory (RAM), custom programmed Programmable Logic Devices (PLD)/Digital Signal Processors (DSP) housed in a processor motherboard, and like devices, which devices may additionally be radiation-hardened.

INDUSTRIAL APPLICABILITY

The invention is further illustrated by the following non-limiting example.

EXAMPLE 1

Scene Identification

The present invention can be applied to the area of scene identification. For example, given a model of a target area with buildings or structures, the invention can identify and sort out the target area within images covering large ground regions, which are either collected by satellite or by high-flying airplane. More specifically, the following functions of the current invention are readily used to perform scene identification:

(1) The Model Handling portion of this invention could be used to perform 3D-to-2D projection for the given 3-D model using the LOS and range information of the sensor;
(2) The Edge Extraction and Reduction portion of the invention can process the input images to extract the edge points;
(3) The WDCP Hough correlation of this invention can be used to generate the correlation surface between the model edge points and the input image points. Then the candidate aim-points for the target area under search could be selected from the correlation surface;
(4) The target/no-target classifier of the invention can be used to classify the candidate areas around the nominated aim-points. Those candidate areas, which are classified as non-target areas, will be eliminated. Then confidence measure will be computed for each of the remaining candidates. Further reduction on the candidate areas can be achieved by applying a threshold to screen out those candidates with low confidence-measure values; and
(5) From this reduced list, the final target area(s) can be selected visually by operator or selected directly by the computer in accordance with the highest confidence measure value.

This whole processing as described above can be implemented as part of a system designed for image exploitation.

The preceding example can be repeated with similar success in other fields of image processing endeavors.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of determining location of a target image within a two-dimensional input image by employing a three-dimensional reference model, the method comprising the steps of:
  extracting object edge points in the input image;
  given estimated seeker line-of-sight orientation and range data, projecting a three-dimensional target reference model to obtain a two-dimensional reference image;
  applying a weighted-direction-cross-product Hough Transform to the object edge points and points of the two-dimensional reference image;
  classifying the input image as containing a target image or not;
  if the input image contains the target image, identifying a location of the target image within the two-dimensional input image;
  computing confidence measure as to the identified location of the target image within the two-dimensional input image; and
  performing confidence accumulation over a plurality of instances of application of the method.

2. The method of claim 1 wherein the extracting step comprises clutter-rejection.

3. The method of claim 1 wherein the projecting step comprises the steps of:
  decompressing a compressed three-dimensional target reference model;
  projecting the three-dimensional target reference model to obtain a two-dimensional reference image, given estimated seeker line-of-sight orientation and range data; and continuously adjusting extent of a ground footprint of the projected two-dimensional reference image based upon estimated seeker-to-ground range.

4. The method of claim 1 wherein the applying step comprises the steps of:
- accumulating Hough correlation counts into Hough planes for individual Canny edge directions;
- super-pixeling individual Hough planes;
- generating the filtered weighted-direction-cross-product Hough correlation surface in super-pixel domain;
- selecting an area of interest in the original pixel domain;
- generating the filtered weighted-direction-cross-product Hough correlation surface in original pixel domain; and
- detecting a peak of the correlation surface as an aim-point.

5. The method of claim 1 wherein the classifying and computing steps comprise employing feature extraction and computing quality measures as to the identified location selected from the group consisting of scene classification and confidence measures.

6. The method of claim 1 wherein the applying step comprises the step of combining Hough planes by pair-wise AND logic.

7. The method of claim 6 wherein the combining step comprises multiplying correlation counts from each pair of Hough planes.

8. The method of claim 7 wherein the combining step comprises performing a weighted sum over the pair-wise products from all combinations of Hough planes in pair.

9. Computer software for determining location of a target image within a two-dimensional input image by employing a three-dimensional reference model, said software comprising code embodied in a storage medium, said code comprising:
- code extracting object edge points in the input image;
- code projecting a three-dimensional target reference model to obtain a two-dimensional reference image given estimated seeker line-of-sight orientation and range data;
- code applying a weighted-direction-cross-product Hough Transform to the object edge points and points of the two-dimensional reference image;
- code classifying the input image as containing a target image or not;
- code identifying a location of the target image within the two-dimensional input image if the input image contains the target image;
- code computing confidence measure as to the identified location of the target image within the two-dimensional input image; and
- code performing confidence accumulation over a plurality of instances of application of the method.

10. The software of claim 9 wherein said extracting code comprises clutter-rejection code.

11. The software of claim 9 wherein said projecting code comprises the following codes:
- code decompressing a compressed three-dimensional target reference model;
- code projecting the three-dimensional target reference model to obtain a two-dimensional reference image, given estimated seeker line-of-sight orientation and range data; and
- code continuously adjusting extent of a ground footprint of the projected two-dimensional reference image based upon estimated seeker-to-ground range.

12. The software of claim 9 wherein said applying code comprises the following codes:
- code accumulating Hough correlation counts into Hough planes for individual Canny edge directions;
- code super-pixeling individual Hough planes;
- code generating the filtered weighted-direction-cross-product Hough correlation surface in super-pixel domain;
- code selecting an area of interest in the original pixel domain;
- code generating the filtered weighted-direction-cross-product Hough correlation surface in area of interest in the original pixel domain; and
- code detecting a peak of the correlation surface as an aim-point.

13. The software of claim 9 wherein said classifying and computing codes comprise code for feature extraction and code for computing quality measures as to the identified location consisting of code of scene classification and code for confidence measures.

14. The software of claim 9 wherein said applying code comprises the code of combining Hough planes by pair-wise AND logic.

15. The software of claim 14 wherein said combining step comprises code multiplying correlation counts from each pair of Hough planes.

16. The software of claim 15 wherein said combining code comprises code performing a weighted sum over the pair-wise products from all combinations of Hough planes in pair.

* * * * *